Figure 1:
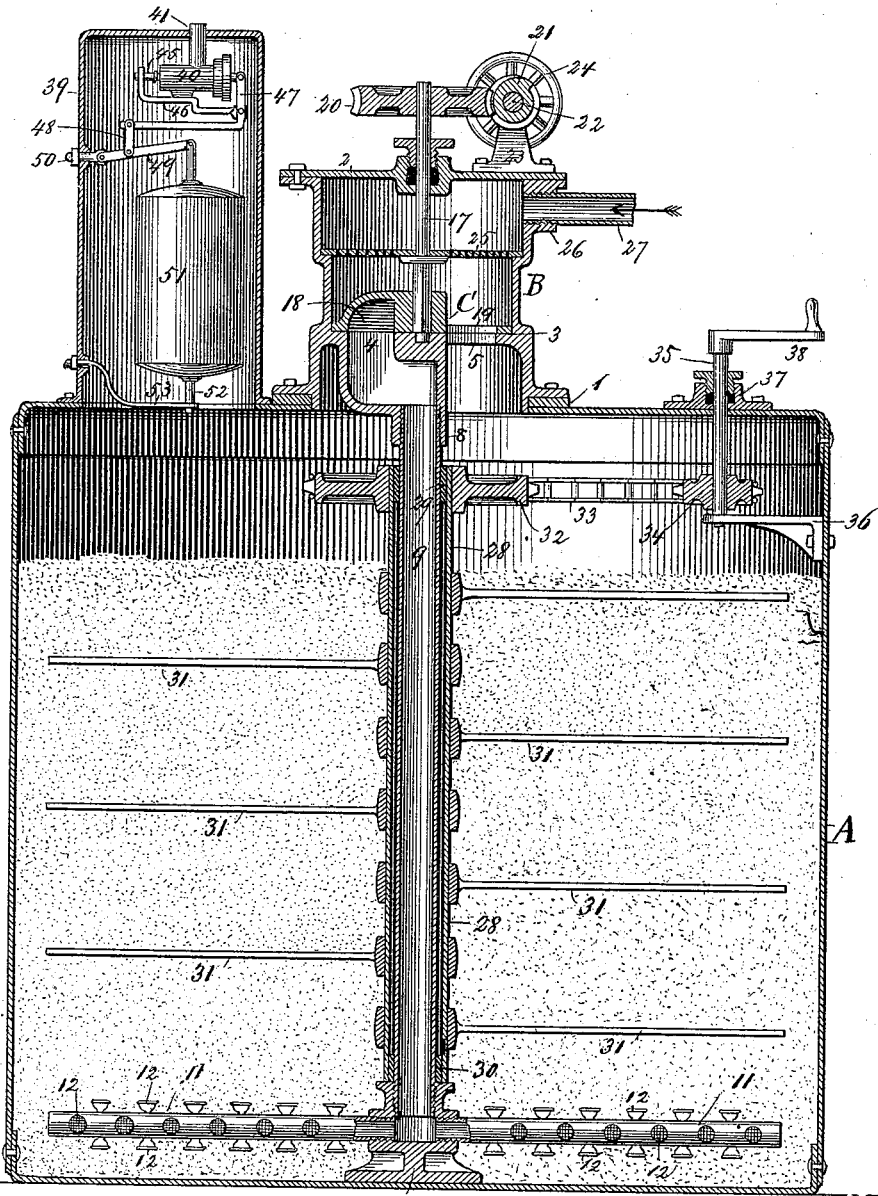

(No Model.)  2 Sheets—Sheet 1.

W. M. JEWELL.
FILTERING APPARATUS.

No. 427,236.  Patented May 6, 1890.

Witnesses:
Otto Luebkert
Charles Shand

Inventor:
William M. Jewell
By Wm. H. Lotz
his attorney (No Model.) 2 Sheets—Sheet 2.
W. M. JEWELL.
FILTERING APPARATUS.
No. 427,236. Patented May 6, 1890.
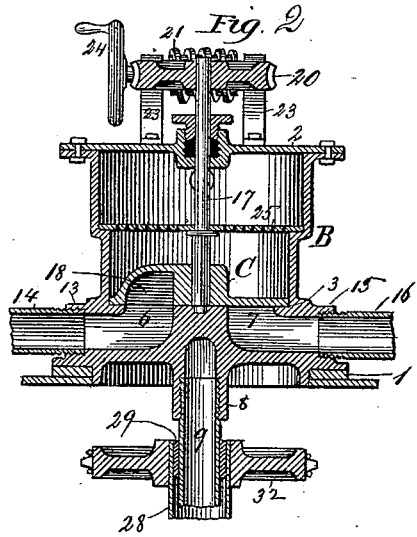
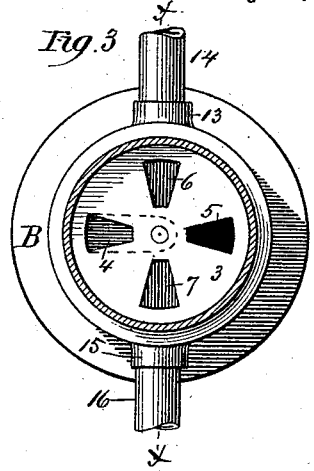
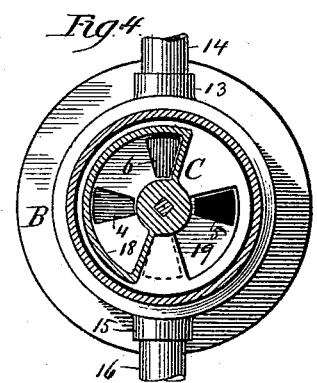
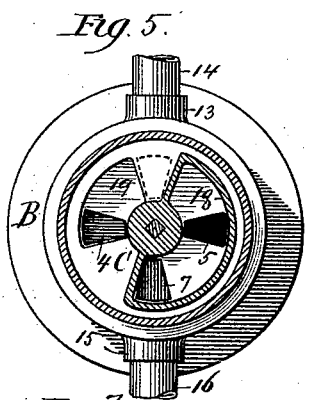
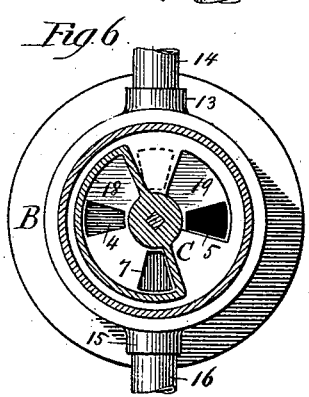
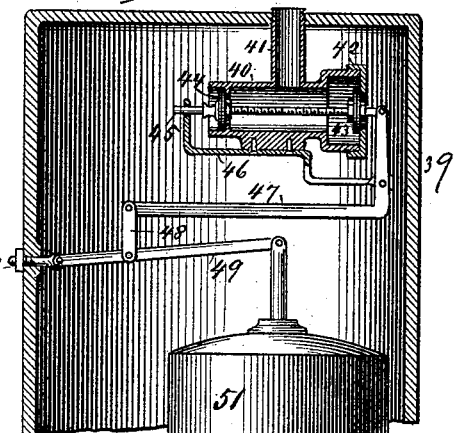
Witnesses:
Otto Luebkert
Charles Shand
Inventor:
William M. Jewell
By Wm H Lotz
his attorney

UNITED STATES PATENT OFFICE.

WILLIAM M. JEWELL, OF CHICAGO, ILLINOIS.

FILTERING APPARATUS.

SPECIFICATION forming part of Letters Patent No. 427,236, dated May 6, 1890.

Application filed December 4, 1889. Serial No. 332,590. (No model.)

*To all whom it may concern:*

Be it known that I, WILLIAM M. JEWELL, a citizen of the United States of America, residing at Chicago, in the county of Cook and State of Illinois, have invented certain new and useful Improvements in Water-Filters, of which the following is a specification, reference being had therein to the accompanying drawings.

This invention relates to apparatus for filtering water; and it has for its object to provide a suitable valve and ports for directing the circulation of the water through the filter and through discharge-pipes for the several purposes of filtering water, of washing out the impurities accumulating in the filter, and of rewashing the apparatus before refiltering again, all with a single movement of such valve; also, to provide a more efficient arrangement for stirring the filtering material while washing out the apparatus, and again in providing an automatic valve to such apparatus for the escape of air liberated from the water during the filtering process; and with these objects in view my invention consists of the novel devices and combinations of devices hereinafter described, and specifically claimed.

In the accompanying drawings, Figure 1 represents a longitudinal vertical section of the entire apparatus; Fig. 2, a transverse vertical section of the valve and casing on line $x$ $x$ in Fig. 3, which represents a sectional plan of the valve-seat. Figs. 4, 5, and 6 represent sectional plans of the valve-seat and the valve in its several positions. Fig. 7 is a longitudinal vertical section of the dome and the air-valve with its connections, and Fig. 8 a section of one of the strainer-cups as connected to the filter-pipe.

Corresponding referential characters in the several figures of the drawings designate like parts.

A denotes the filtering-tank having a central circular opening in its top re-enforced by a ring 1, riveted around the edge thereof, and upon this ring is bolted the bottom flange of the valve-casing B, closed on top by cover 2 bolted thereon. The circular valve-seat 3 of this casing has four ports 4, 5, 6, and 7 equally spaced or rectangular to each other. The port 4 communicates with nozzle 8 centrally in the bottom of the casing B, into which is screwed the upper end of a vertical pipe 9 extending to near the bottom of tank A, where its lower end is screwed into a foot-casting 10, secured upon the bottom of tank A and providing a series of nozzles for radial pipes 11, coupled therein with one end and closed on their opposite ends, and into these radial pipes 11 are screwed a series of cups 12, the flaring openings of which are closed with wire screen or finely-perforated sheet metal to form strainers. The port 5, that is diametrically opposite to port 4, communicates directly with the interior of the tank, the port 6 communicates with a nozzle 13, into which is coupled the end of a pipe 14, leading to the purified-water reservoir, and the port 7 communicates with a nozzle 15, into which is coupled the pipe 16, leading into the sewer.

The valve C has a central hub with a square hole for stem 17, to one side of which hub said valve is formed as a semicircular cup 18, while at its opposite side the valve is continued as a semicircular disk having a segmental port 19 in the centrally-radial line thereof. This valve C can be so adjusted that its cup portion 18 will cover two adjacent ports 4, 5, 6, or 7, while its port 19 will communicate with one of the other two ports and the remaining port will be closed, the cup portion 18 thus providing a communicating-channel between the two ports covered thereby. The lower end of stem 17 is pivoted in a socket of the valve-seat 3, and this stem extends upward through a stuffing-box in cover 2, and upon its upper extremity is mounted a worm-wheel 20, engaging a worm 21, mounted upon a horizontal shaft 22, journaled in standard-bearings 23 and having mounted upon one of its overhanging ends a hand-wheel 24, by which to operate said valve C. The positions of valve C relative to the ports in valve-seat 3 may be indicated by suitable marks on worm-wheel 20, and by a suitable fixed pointer either secured upon cover 2 or to one of the standard-bearings 23. Intermediate of valve C and cover 2 of the valve-casing B is secured a perforated diaphragm 25, and between this and cover 2 is the inlet or feed nozzle 26, which, by a pipe 27, is to be coupled with the feed-pump. For filtering water the valve C is to be in the position as shown by Figs. 1, 2, and 4, when the water forced in through pipe 27, after passing through the perforations of diaphragm 25, will enter tank A through opening 19 of the valve and through port 5 of the valve-casing. This water, after trickling through the filtering material, will enter, through strainers 12, the pipes 11, will thence flow through pipe 9 and through port 4 into the cup portion 18 of valve C, and thence entering port 6, to be carried off through pipe 14. For washing out the impurities collecting in the filtering-tank the valve C is adjusted to the position shown by Fig. 5, when the water from pipe 27 will enter port 4 and thence pipe 9 and branch pipes 11, to issue from strainers 12, rising through the filtering material, thence escaping through port 5 into the cup portion 18 of valve C, and thence through port 7 and pipe 16 into the sewer. After the tank has thus been thoroughly washed the unfiltered water remaining in pipes 9 and 11 must be discharged and replaced by filtering water before the discharge is to be directed into the pure-water reservoir through pipe 14. This is accomplished by adjusting valve C to the position shown by Fig. 6, when the water from pipe 27 will enter the tank through port 5, to pass downward through the filtering material. Thence through strainer-cups 12 it will enter pipes 11 and 9, and thence through port 4, the cup 18 of valve C, and port 7 it will enter pipe 16, to be carried off into the sewer until perfectly-pure water is obtained again, when the valve is readjusted to its first position again. (Shown by Figs. 1, 2, and 4.) By the adjustment of this single valve it will be seen that the circulation and discharge of the water can thus be directed for the several operations desirable with a filtering apparatus. The pipe 9, thus fixed to be stationary, will provide the shaft or pivot for a larger pipe 28, sleeved upon pipe 9 and having brass bushings 29 and 30 in its ends, that will form journal-bearings for the pipe 28, which with its lower end rests upon the upper nozzle of foot-casting 10. Upon this pipe 28 are mounted a series of radial arms 31, and upon its upper extremity is mounted a sprocket-wheel 32, which by an endless chain 33 is imparted motion from a sprocket-pinion 34, mounted upon shaft 35, pivoted with its lower end in a bracket 36 and projecting through a stuffing-box 37, secured upon tank A, with a crank 38 upon the upper end of said shaft 35, which with turning will rotate pipe 28 and arms 31 for stirring the filtering material, while the current of water through tank A is reversed for washing out said tank, whereby all light and slimy impurities intermixed with such filtering material will be separated and carried off with the water.

With filtering water the air contained therein will become free and rise to the top, and without a provision for the escape of such air it would soon fill the upper portion of the tank A, and, displacing the water, would interfere with the filtering operation; and, again, providing a vent to be constantly open would allow water to escape through the same. It is therefore necessary to provide a device that will discharge the air without allowing the escape of water. This device consists in providing tank A with a dome 39, to be hermetically tight. Under the top of this dome 39, I secure the valve-casing 40, having an air-escape pipe 41, tapped into the crown-plate of the dome, so that the inner portion of the valve-casing 40 will communicate through this pipe 41 with the exterior atmosphere. The valve-casing 40 consists of a tube having an expanded end, upon which is screwed a cap 42, provided with a central hole and forming the seat for one valve 43, and in the opposite end of said casing is an interior annular flange forming the seat for the other valve 44, both valves 43 and 44 being lined with rubber and being connected by a screw-stem 45, upon which these valves are adjustably secured. The air-pressure against both valves thus arranged will counterbalance. The valve-stem 45 being guided at one end in an eye-bracket 46, its opposite end is connected with one arm of a bell-crank 47, pivoted to an elongation of bracket 46, the other arm of bell-crank 47 being coupled by link 48 with the middle portion of a lever 49, pivoted with one end to an eyebolt 50, secured in the side wall of dome 39. Said lever 49 has suspended to its opposite end a float 51. The bottom of the float 51 is provided with a projecting stud 52, guided in an eye-bracket 53, which is secured in the lower part of the dome 39. Thus arranged, the weight of float 51, when not supported by the water, will move both valves 43 and 44 away from their seats, allowing a free escape of air through pipe 41; but as the water rises it will raise the float, and thereby will close the valves so that no air can escape, and these valves will then remain thus closed until sufficient air accumulates, displacing the water for the float to sink and open the valves again, whereby the water in the tank and dome will never rise nor fall beyond certain limits thus automatically regulated.

What I claim is—

1. The combination, with filtering-tank A, provided with vertical pipe 9, branch pipes 11, and strainers, of valve-casing B, with inlet-pipe 27 and with a circular valve-seat having four segmental ports 4, 5, 6, and 7 on relative rectangular positions, the port 4 communicating with pipe 9, port 5 communicating with the interior of tank A, port 6 communicating with the purified-water-discharge pipe, and port 7 communicating with the washout-water-discharge pipe, and rotating valve C, having cup portion 18 to provide communication for two adjacent ports and port 19 to communicate with either one of the remaining ports, all substantially as set forth.

2. The combination, with filtering-tank A, provided with vertical pipe 9, branch pipes 11, and strainer-cups 12, of valve-casing B, with inlet-pipe 27 and with a circular valve-seat having four segmental ports 4, 5, 6, and 7, of equal size and circumferentially equal distances apart, respectively communicating one with pipe 9, one with the interior of tank A, one with the pure-water-discharge pipe, and one with the washout-water-discharge pipe, valve C, having cup portion 18 to provide communication between two adjacent ports and port 19 to communicate with either one of the remaining ports and valve-stem 17, projecting through the top of casing B, and having connected suitable gearing for operating such valve, substantially as set forth.

3. The combination, with filtering-tank A, provided with dome 39, of valve-casing 40, communicating through pipe 41 with the exterior atmosphere, and valves 43 and 44 inside of casing 40, and secured upon stem 45 of bell-crank 47, connecting with the valve-stem and having suspended by suitable connections the float 51 in a manner that the rising and falling of said float will open and close such valves, substantially as set forth.

In testimony whereof I affix my signature in presence of two witnesses.

WILLIAM M. JEWELL.

Witnesses:
WILLIAM H. LOTZ,
OTTO LUEBKERT.